US005937646A

United States Patent [19]

Zakula

[11] Patent Number: 5,937,646

[45] Date of Patent: Aug. 17, 1999

[54] HYDRAULIC CHARGE BOOST SYSTEM FOR A GANTRY CRANE

[75] Inventor: Daniel Brian Zakula, Mokena, Ill.

[73] Assignee: Mi-Jack Products, Hazel Crest, Ill.

[21] Appl. No.: 08/890,019

[22] Filed: Jul. 10, 1997

[51] Int. Cl.[6] .................................................... F16D 31/02

[52] U.S. Cl. ................................ 60/430; 60/475; 60/486

[58] Field of Search ............................ 60/475, 438, 428, 60/430, 486, 473, 476, 403, 429, 477, 479, 447; 91/436

[56] References Cited

U.S. PATENT DOCUMENTS

| | | | |
|---|---|---|---|
| 1,835,979 | 12/1931 | Ernst et al. | 60/430 X |
| 2,830,668 | 4/1958 | Gaubis et al. | 60/428 X |
| 3,061,109 | 10/1962 | Stone . | |
| 3,578,787 | 5/1971 | Brickett . | |
| 3,636,708 | 1/1972 | Karman et al. | 60/475 X |
| 3,645,406 | 2/1972 | Brazell . | |
| 3,701,439 | 10/1972 | Lado . | |
| 3,777,899 | 12/1973 | Witwer . | |
| 3,963,127 | 6/1976 | Ericksson . | |
| 4,077,211 | 3/1978 | Fricke | 60/428 |
| 4,359,130 | 11/1982 | Kirkham | 60/428 X |
| 4,427,121 | 1/1984 | Clements . | |
| 4,520,626 | 6/1985 | Nakajima et al. | 60/475 X |
| 4,649,705 | 3/1987 | Williamson | 60/420 |
| 4,667,834 | 5/1987 | Lanigan . | |
| 4,779,416 | 10/1988 | Chatterjea et al. | 60/429 |
| 4,819,430 | 4/1989 | Becker | 60/421 |
| 5,007,544 | 4/1991 | Saotome et al. . | |
| 5,179,836 | 1/1993 | Dantlgraber | 60/430 |
| 5,226,289 | 7/1993 | Krebs | 60/430 |

FOREIGN PATENT DOCUMENTS

| | | | |
|---|---|---|---|
| 57-73203 | 5/1982 | Japan | 60/430 |
| 58-193901 | 11/1983 | Japan | 60/475 |

*Primary Examiner*—John E. Ryznic
*Attorney, Agent, or Firm*—Thomas A. Belush

[57] ABSTRACT

In a hydraulic cylinder actuation system for a crane having a conventionally charged main hydraulic pump, a supplemental pump or "charge boost" pump is provided. To efficiently achieve fast actuation speeds of the cylinder, the charge boost pump provides supplemental charge flow in response to a need in the system. The charge boost pump is driven independently from the main pump or may be driven by the main pump if the main pump is equipped with drive thru capability to provide a variable output and preferably includes a load sensing means for controlling the output.

12 Claims, 2 Drawing Sheets

HYDRAULIC CHARGE BOOST SYSTEM FOR A GANTRY CRANE

FIELD OF THE INVENTION

The present invention generally relates to hydraulic circuits and more particularly relates to charged hydraulic actuator systems for gantry cranes.

BACKGROUND OF THE INVENTION

Closed loop hydrostatic circuits are conventionally used for actuating components in mobile heavy equipment. In a typical closed loop hydrostatic system, a driving pump is connected to provide pressurized fluid communication to an actuator, such as a hydraulic cylinder or hydraulic motor. To affect reversible actuation, the system is switchable so that the driving pump can selectively provide pressure in opposite directions to the actuator.

More specifically, in a conventional system wherein the actuator is a hydraulic motor, the fluid flow through the motor is directed to return to the driving pump. When the flow direction from the driving pump is reversed, the rotation direction of the motor is reversed. The speed of rotation of the motor is dependent on the flow rate provided by the driving pump.

Also, in a conventional system wherein the actuator is a hydraulic cylinder, the driving pump provides pressurized flow to a base side of the cylinder (against a top side of the piston) to cause a reciprocating rod to extend. The rod is caused to retract by providing pressurized flow into a rod side of the cylinder.

Some amount of internal fluid leakage occurs in a real hydraulic systems. In the hydraulic motor system, for example, leakage occurs at the high pressure side of the motor. This leaked fluid is typically returned to the system reservoir through a case drain port in the motor. However, because of this leakage, fluid returns to the pump at a slightly lower flow rate than the fluid supplied to the motor from the pump.

Additional factors in a hydraulic cylinder system result in an even greater flow rate differential. In particular, the cylinder has a substantially higher maximum volume at a piston side than at a rod side, due to a volume occupied by the rod itself. Therefore, the flow rate returning to the pump from the piston side when the rod is retracting is substantially greater than the flow rate entering the rod side of the cylinder. Because of this flow rate differential, excess flow is conventionally returned to the reservoir through a relief valve during rod retraction. Conversely, when the rod is being extended, a flow rate returning to the pump from the rod end of the cylinder is substantially less than the flow rate entering the base end of the cylinder from the pump.

In these instances where an input/output flow rate differential exists, the flow rate deficiency is compensated by a make-up and/or control fluid flow known as "charge" flow. In known systems, the charge flow is supplied by a charge pump integrally mounted in the main pump.

Typically, in the conventional main pump, a driving pump and integral charge pump are driven by a common shaft. However, because the conventional charge pump is mechanically driven by the same shaft as the driving pump, the integral charge pump has a fixed rate output corresponding to a given rotational speed of the driving pump. Problems occur in conventional charging systems because the charge pump flow rate is directly dependent on a corresponding rotational speed of the driving pump.

A hydraulic system with a conventional charge pump can fail to meet an upper range of desired actuation speeds. The charge flow rate demand increases with actuation speed, particularly in the hydraulic cylinder system wherein the bottom piston area at the rod side is smaller than a top piston area at the opposite side. Unfortunately, when higher actuation speeds are approached, the charge flow rate demand exceeds the fixed flow rate output capacity of a conventional integral charge pump, resulting in cavitation within the charge pump and an undesirably low peak in actuation speed performance.

The charge flow rate must be increased in order to increase actuation speed. However, to redesign a conventional integral charge pump to provide a high flow rate capacity would be impractical because the nature of integral charge pumps necessitates the sacrifice of high actuation speeds in the interest of economy. Specifically, the need for charge flow fluctuates depending on the crane operation being performed, but the conventional charge pump generates charge flow output whether or not the system needs it, and excess flow is diverted to the fluid reservoir by a relief valve. This generation of excess charge flow wastes energy for running the charge pump, steals power away from the main pump, and unnecessarily heats the hydraulic fluid. Because an integral charge pump designed to support high actuation speeds would exhibit exaggerated inefficiencies, practical design considerations dictate a compromise between efficiency and actuation speed. As a result, a charge pump is typically engineered to have an output capacity in an intermediate range, resulting in slower-than-desired peak actuation speeds.

Therefore, a need exists for a means to efficiently provide a high charge flow rate in order to achieve high actuation speeds.

SUMMARY OF THE INVENTION

An object of the present invention is to provide an improved charging means for a hydraulic actuator circuit.

Another object of the present invention is to provide a charged hydraulic system with an enhanced charge flow rate capacity to achieve improved actuation speeds.

A further object of the present invention is to provide a hydraulic system that is efficient.

The present invention overcomes the deficiencies of the prior art by providing a supplemental pump or charge "boost" pump. The charge boost pump is independently driven from the main pump, or may be driven by the main pump if the main pump is equipped with drive thru capability. Also, the charge boost pump is actuatable on demand for efficient operation and has a variable output to meet a demanded charge flow rate without providing excess charge flow. The charge boost pump is operated with a load sensing means for generating supplemental charge flow as needed.

In an embodiment of the invention, a hydraulic system is provided for a crane. The system includes hydraulic actuator which is moveable in extendible and retractable directions, for example a hydraulic piston and cylinder. The actuator is connected to a main pump for fluid actuation. This main pump may be a conventional pump which includes a primary driving pump and a standard integrally-mounted charge pump. Typically, the driving pump and charge pump are driven from a common shaft, and the integral charge pump provides a flow rate which is fixed relative to the rotational speed of the driving pump. The combined flow rates of the driving and integral pumps are capable of driving the actuator only up to a limited actuation speed beyond which a flow rate capacity of said charge pump is exceeded. According to the invention, a charge boost pump is connected to provide a supplemental charge flow to the actuator to meet charge flow demands of the actuator exceeding the capacity of the integral charge pump, thereby facilitating a driving of the actuator at an actuation speed greater than the limited actuation speed.

An advantage of the present invention is that it provides a charging means suitable for use with a closed loop hydrostatic cylinder circuit, efficiently enabling faster actuation speeds.

These and other features and advantages of the invention are described in, and will be apparent from, the detailed description of the preferred embodiments and from the accompanying drawings.

DETAILED DESCRIPTION OF THE PREFERRED EMBODIMENTS

Figure 1:
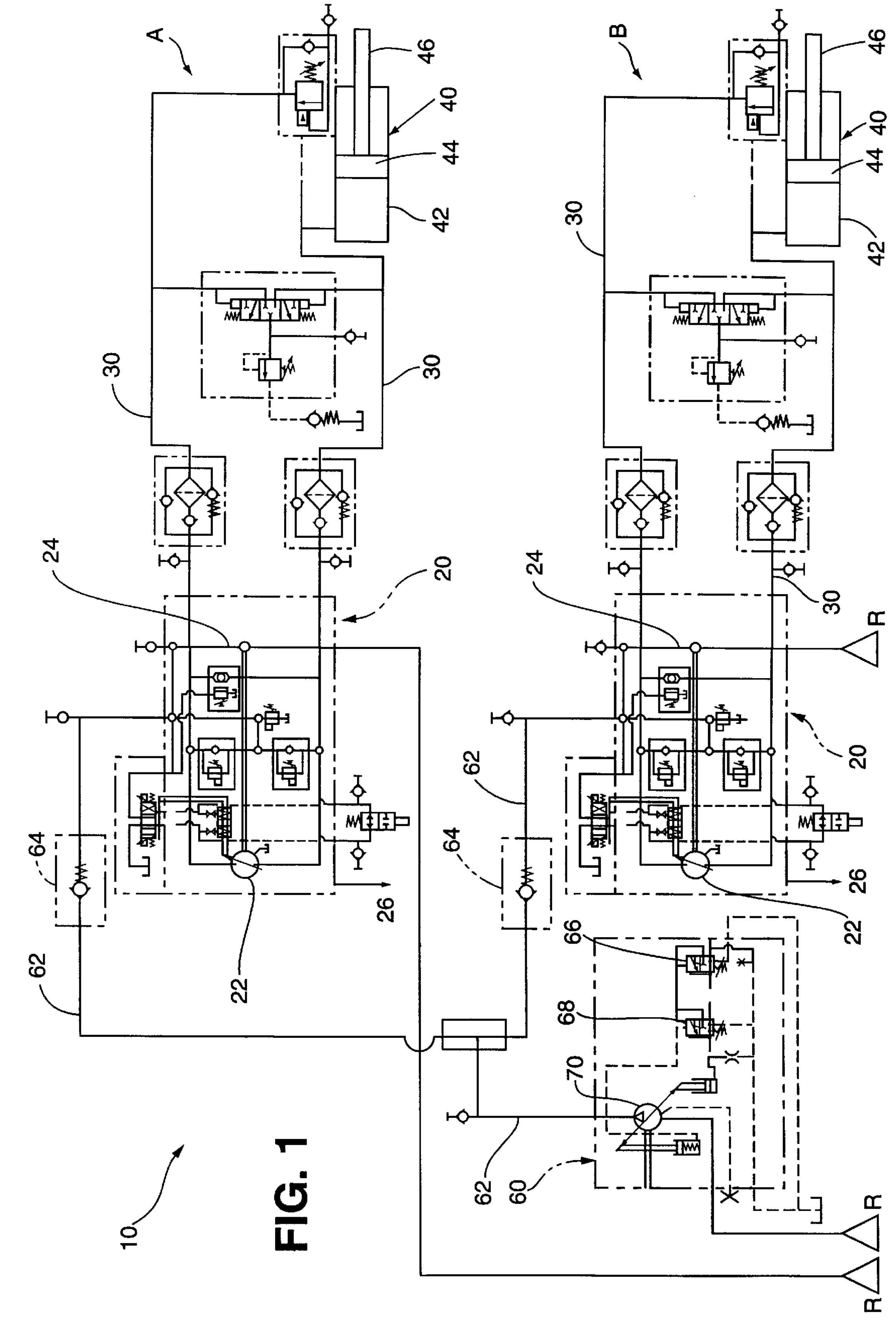
FIG. 1 is a schematic diagram of a hydraulic flow circuit according to teachings of the invention.

Now referring to the Figures, wherein like numerals designate like components, there is shown in FIG. 1 a hydraulic system 10 according to an embodiment of the invention. The system 10 generally includes two hydraulic circuits A and B, each having a main pump 20 and an associated actuator 40. As will be appreciated by those skilled in the art, the actuator 40 is connected to move structural members of the crane, such as steering components or lifting trolley components (not shown). Each circuit has a network of conduits 30 to provide fluid communication between the respective pump 20 and actuator 40.

As shown, each of the actuators 40 includes a hydraulic cylinder 42 containing a reciprocable piston 44 with a rod 46 connected thereto. Via the conduits 30, the main pump 20 is operable to selectively deliver flow to a base side of the cylinder 42 to extend the piston 44 and rod 46 or to a rod side of the cylinder 42 to retract the piston 44 and rod 46.

Each of the main pumps 20 may be of a standard type including a driving pump 22 and an integral charge pump 24 mounted in a conventional manner to be co-driven by a common shaft. It will be understood by those skilled in the art that the system could have one or more main circuit A, B, or that another number of main pumps or actuators could be provided in other embodiments.

As explained above, the rod 46 occupies a substantial volume within the cylinder 42. Therefore, when the piston 44 and rod 46 are retracted, a greater flow rate exits the actuator 40 than the associated driving pump 22 is supplying. This excess return fluid is released through a valve to a reservoir R. Conversely, when the piston 44 and rod 46 are extended, a greater flow rate must be supplied to the actuator 40 than is being returned. Charge flow must be introduced into the circuit at a flow rate sufficient to compensate for this flow rate differential.

The integral charge pump 24 is operable to provide charge flow at a rate capacity which is fixed in relation to the speed of the driving pump 22. However, the charge flow rate demand increases with a desired actuation speed, due to the volume occupied by the rod. Above a certain limited actuation speed, the charge flow rate demand of the actuator exceeds the flow rate capacity of the integral charge pump 24. By means of the invention, supplemental charge flow is provided in an amount sufficient to meet this charge flow rate demand in excess of the integral charge pump capacity.

According to a preferred embodiment of the invention, a variable-displacement, load-sensing charge boost pump is connected to supply supplemental hydraulic charge flow into the flow circuit when the conventional integral charge pump cannot meet the demand for charge flow. More specifically, as illustrated in FIG. 1, a charge boost pump 60 is provided. The charge boost pump 60 delivers supplemental charge flow through a boost supply conduit 62 which is connected to the main pump 20 of each circuit A and B. The charge boost pump 60 is driven independently from the main pumps 20 (such as by an electric motor or other means, not shown) or may be driven by the main pump when the main pump is equipped with drive thru capability and is capable of variable displacement fluid output in response to fluctuating load demands and corresponding fluctuating flow rate demands. The charge boost pump 60 and the integral charge pump 24 draw hydraulic fluid from a common reservoir, indicated as R in FIG. 1.

Still referring to the schematic diagram of FIG. 1, the system 10 includes a pair check valves 64, each being located in the charge boost supply conduit 62 between the charge boost pump 60 and a respective one of the circuits A, B to permit only one-way fluid flow from the charge boost pump 60 to the circuits A, B. When the integral charge pump 24 in the main pump 20 is capable of meeting the flow rate demands to the actuators 40, the check valve 64 is closed to prevent fluid loss from the respective circuit A or B by preventing a fluid flow toward the charge boost pump 60. However, when either main pump 20 experiences a pressure loss due to a lack of charging pressure, that pressure loss is communicated through the respective check valve 64 and through the boost supply conduit 62, resulting in an automatic charge flow compensation by the charge boost pump 60.

In general, the charge boost pump 60 includes an appropriate load-sense valve 66 arranged to detect such a charge flow pressure loss in the main pump 20, as communicated through the boost supply conduit 62. More particularly, when the integral charge pump 24 of the main pump 20 can meet the charge flow demand, the charge boost pump 60 maintains a pressure in the conduit 62 greater than a predetermined minimum limit set by the load sense valve 66, but the charge boost pump 60 generates no outward charge boost flow in this condition. However, when the extension speed of one or more of the actuators 40 demands a charge flow rate that exceeds the output capacity of the associated integral charge pump 24, the resulting drop in charge pressure in the main pump 20 is communicated through the boost supply conduit 62 to the load sense valve 66. When the main pump charge pressure drops below the predetermined minimum limit, the charge boost pump 60 is controlled to deliver charge flow to through the conduit through the respective check valve 64 to supplement charge flow in whichever circuit A and/or B has a charge flow deficiency.

In a preferred embodiment, the load sense valve 66 is biased by valve spring (not shown) having a spring force setting which determines the minimum charge pressure limit at which the charge boost pump 60 begins to provide charge boost flow. The charge boost pump 60 also contains a maximum pressure limiting valve 68 and a displacement control mechanism 70 which operate in conjunction with the load sense valve 66 to provide and maintain boost flow on demand outwardly through the boost supply conduit 62 at only a needed flow rate.

Figure 2:
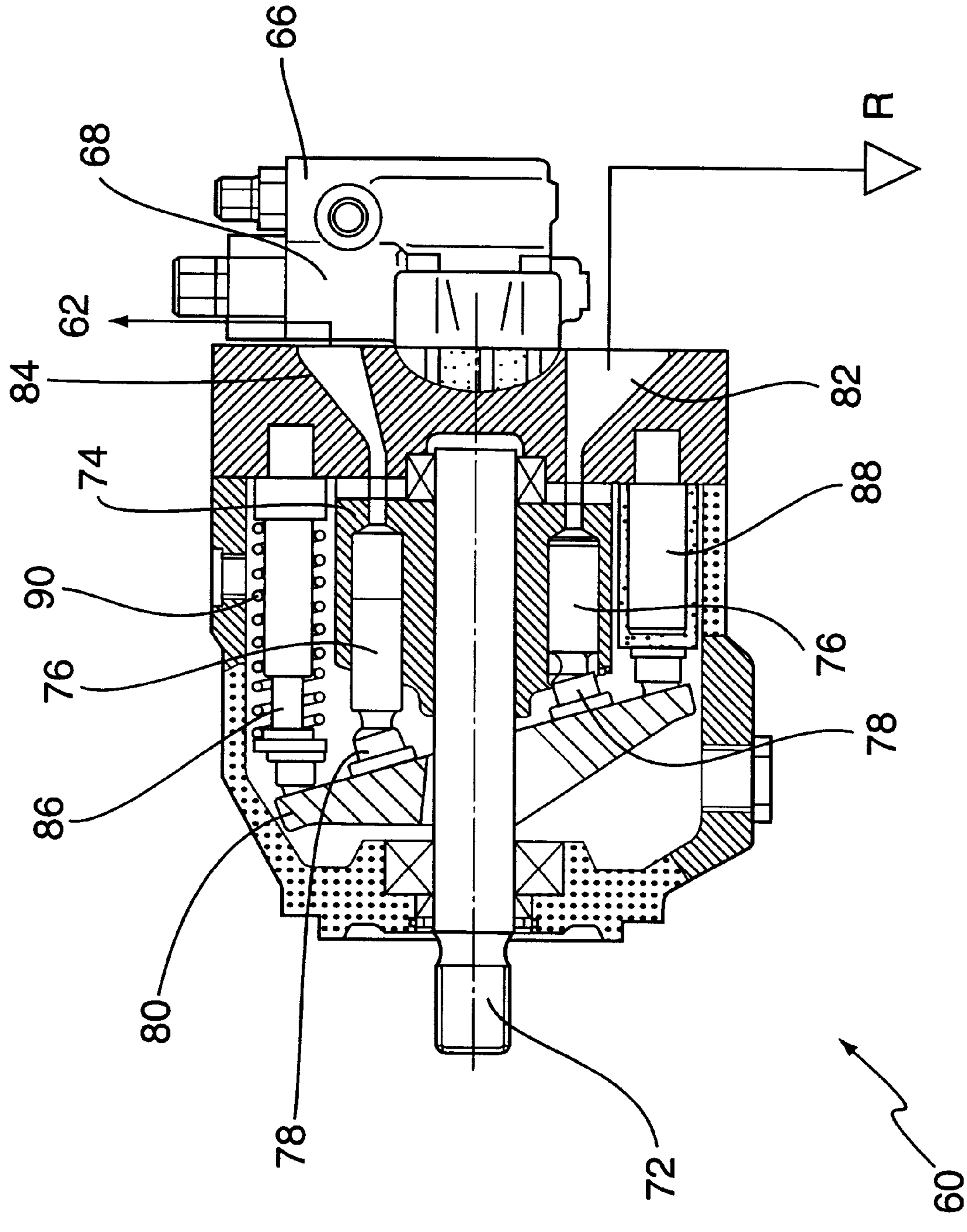
FIG. 2 is a sectional side view of a charge boost pump which may be used in the circuit of FIG. 1.

Turning to FIG. 2, an exemplary embodiment of the charge boost pump 60 is illustrated in greater detail. The charge boost pump 60 may be a conventional, variable-output, load-sensing pump, such as a Model A10VO (Series 30) pump commercially available from REXROTH®. This particular pump 60, as illustrated in FIG. 2, is a swashplate-type pump.

As will be understood by those skilled in the art, the pump 60 includes a rotatable drive shaft 72 which rotates a piston barrel 74 containing a plurality of axially-reciprocating pumping pistons 76. Each of the pumping pistons 76 has a projecting piston shoe 78 that slides along a pivotable swashplate 80 as the barrel 74 rotates. This causes the pumping pistons 76 to axially reciprocate, pumping fluid from a respective inlet port 82 to an outlet port 84 in a known manner. The inlet port 82 receives fluid from the reservoir R, and the outlet port 84 is connected to the boost supply conduit 62.

The swashplate 80 is tiltable to regulate the pressure and flow output of the charge boost pump 60 by determining a stroke of the pumping pistons 76. This pumping stroke variation results in a variable pumping flow rate from the inlet port 82 to the outlet port 84. The tilt position of the swashplate 80 is determined by the displacement control mechanism 70 which includes a stroking piston 86 and a control piston 88 which are reciprocably engaged against the swashplate 80 in an opposingly rockable manner, so that when the stroking piston 86 is extended, the control piston 88 is retracted, and vice versa.

The swashplate 80 is normally biased toward a fully tilted position by a compressed spring 90 concentrically mounted over the stroking piston 86, as illustrated in FIG. 2. The load sense valve 66 and maximum pressure limiting valve 68 control the amount of pressure acting on the control piston 88 and stroking piston 86 to automatically vary the output of the charge boost pump 60 in a regulated manner. When the load sense valve 66 senses charge pressure at the conduit 62 above the minimum limit, the swashplate 80 is tilted so that no flow is produced through the outlet port 84, but so that a maximum pressure or standby charge boost pressure is maintained within the conduit 62. However, when pressure in the conduit 62 drops to a the set minimum level because of a pressure drop in one of the main pumps 20 (FIG. 1), the fluid pressure operably acts through load sense valve 66 and the maximum pressure limiting valve 68 to move the stroking piston 86 and control piston 88, adjustably balancing the swashplate 80 to regulate boost flow. The output is regulated to provide boost flow sufficient to maintain the set charge pressure.

Advantageously, because the pressure builds up only to the set point, the charge boost pump 60 only generates an amount of fluid necessary to satisfy load conditions, minimizing power usage and fluid heating. Only the required amount of make up flow is generated by the charge boost pump 60, without excess. This advantageously avoids a need to divert flow through a relief valve, as happens in the integral charge pump 24 in the main pump 20.

While the invention has been described in connection with certain preferred embodiments, there is no intent to limit it to those embodiments. On the contrary, it is recognized that various changes and modifications to the exemplary embodiments described herein will be apparent to those skilled in the art, and that such changes and modifications may be made without departing from the spirit and scope of the present invention. Therefore, the intent is to cover all alternatives, modifications, and equivalents included within the spirit and scope of the invention as defined by the appended claims.

What is claimed is:

1. A hydraulic system for a gantry crane comprising:

a hydraulic circuit including a hydraulic actuator and a main pump providing a flow of hydraulic fluid to the actuator to drive the actuator up to a limited speed, said main pump including a driving pump and an integral charge pump driven off the same shaft as the driving pump wherein the integral charge pump has a charge flow rate which is fixed relative to the rotational speed of the driving pump; and a charge boost pump providing a charge boost flow of fluid into the circuit at a variable flow rate which is independent from a flow rate of the main pump, said charge boost pump supplementing said flow of hydraulic fluid of said main pump to drive the actuator at a speed greater than said limited speed.

2. The hydraulic system according to claim 1, wherein a flow rate of fluid entering the actuator is sometimes greater than a flow rate of fluid exiting the actuator, resulting in a flow rate differential, and wherein the charge boost pump provides a charge boost flow at a variable rate sufficient to compensate for said differential to the extent that the differential exceeds a capacity of the main pump.

3. The hydraulic system according to claim 2, wherein the actuator includes a piston with a rod connected at one side thereof, and a cylinder within which the piston is moveably disposed, the cylinder having a rod end through which the rod is extendible at an opposite base end, wherein said differential is at least partially caused by a changing volume of the rod within the cylinder.

4. The hydraulic system according to claim 1, wherein said charge boost pump is capable of providing a variable displacement output.

5. The hydraulic system according to claim 4, wherein said charge boost pump includes a load sensing means operable to adjust a displacement of said charge boost pump in response to fluid pressure fluctuations in said circuit.

6. The hydraulic system according to claim 4, wherein said charge boost pump maintains a constant charge pressure in said circuit.

7. A hydraulic system for a crane, the system comprising:

a hydraulic actuator moveable in extendible and retractable directions;

a main pump including a driving pump and an integral charge pump, the integral charge pump providing a flow rate which is fixed relative to the rotational speed of the driving pump, the main pump being connected in fluid communication with the actuator so that the combined flow rates of the driving pump and integral charge pump are capable of driving the actuator at up to a limited actuation speed beyond which a flow rate capacity of said integral charge pump is exceeded;

a charge boost pump connected to provide a supplemental flow of fluid in addition to said combined flow rates to the actuator to drive the actuator at an actuation speed greater than said limited actuation speed.

8. The hydraulic system according to claim 7, wherein said main pump provides a delivery flow rate of fluid to the actuator and receives a return flow rate of fluid from the actuator which is sometimes less than the delivery flow rate by a flow rate differential, and wherein said charge boost pump automatically provides said supplemental flow to the actuator at a flow rate in an amount by which the differential may exceed said flow rate capacity of the integral charge pump.

9. The hydraulic system according to claim 7, wherein said charge boost pump includes a load sensing means operable to adjust a displacement of said charge boost pump in response to fluid pressure fluctuations in the main pump.

10. The hydraulic system according to claim 9, wherein said charge boost pump maintains a constant charge pressure in said main pump.

11. A hydraulic system for a crane, the system comprising:

a hydraulic actuator moveable in extendible and retractable directions;

a main pump including a driving pump and an integral charge pump, the integral charge pump providing a flow rate which is fixed relative to the rotational speed of the driving pump, the main pump being connected in fluid communication with the actuator so that the combined flow rates of the driving pump and integral charge pump are capable of driving the actuator at up to a limited actuation speed beyond which a flow rate capacity of said integral charge pump is exceeded;

a charge boost pump connected to provide a supplemental flow of fluid to the actuator to drive the actuator at an actuation speed greater than said limited actuation speed; and wherein said charge boost pump includes a load sensing means operable to adjust a displacement of said charge boost pump in response to fluid pressure fluctuations in the main pump.

12. The hydraulic system according to claim 11, wherein said charge boost pump maintains a constant charge pressure in said main pump.

* * * * *